United States Patent
Ku et al.

(10) Patent No.: US 12,322,167 B2
(45) Date of Patent: Jun. 3, 2025

(54) COMPUTERIZED SYSTEM AND METHOD FOR IMAGE CREATION USING GENERATIVE ADVERSARIAL NETWORKS

(71) Applicant: YAHOO AD TECH LLC, Dulles, VA (US)

(72) Inventors: Yueh-Ning Ku, Sunnyvale, CA (US); Mikhail Kuznetsov, New York, NY (US); Shaunak Mishra, New York, NY (US); Paloma de Juan, New York, NY (US)

(73) Assignee: YAHOO AD TECH LLC, New York, NY (US)

( * ) Notice: Subject to any disclaimer, the term of this patent is extended or adjusted under 35 U.S.C. 154(b) by 587 days.

(21) Appl. No.: 17/563,146

(22) Filed: Dec. 28, 2021

(65) Prior Publication Data

US 2023/0206614 A1    Jun. 29, 2023

(51) Int. Cl.
| | | |
|---|---|---|
| *G06V 10/82* | (2022.01) | |
| *G06N 3/02* | (2006.01) | |
| *G06T 5/50* | (2006.01) | |
| *G06T 5/77* | (2024.01) | |
| *G06T 7/11* | (2017.01) | |
| *G06V 10/26* | (2022.01) | |

(Continued)

(52) U.S. Cl.
CPC ............... *G06V 10/82* (2022.01); *G06N 3/02* (2013.01); *G06T 5/50* (2013.01); *G06T 5/77* (2024.01); *G06T 7/11* (2017.01); *G06V 10/26* (2022.01); *G06V 10/462* (2022.01); *G06V 10/88* (2022.01)

(58) Field of Classification Search
CPC ...... G06V 10/82; G06V 10/26; G06V 10/462; G06V 10/88; G06V 10/273; G06N 3/02; G06N 3/0464; G06N 3/0475; G06N 3/045; G06N 3/088; G06T 5/50; G06T 5/77; G06T 7/11; G06T 5/60; G06T 11/00; G06T 2207/20084

See application file for complete search history.

(56) References Cited

U.S. PATENT DOCUMENTS

| | | | | |
|---|---|---|---|---|
| 2016/0364419 | A1* | 12/2016 | Stanton | ............... G06F 16/41 |
| 2023/0252072 | A1* | 8/2023 | Kislyuk | ............ G06F 16/24578 |
| | | | | 707/728 |

FOREIGN PATENT DOCUMENTS

KR    102482262 B1 * 12/2022    ............... G06T 7/11

OTHER PUBLICATIONS

Xuebin Qin et al., "U2-Net: Going deeper with nested U-structure for salient object detection", 2020, Pattern Recognition, vol. 106, p. 1-16 (Year: 2020).*

(Continued)

*Primary Examiner* — Chan S Park
*Assistant Examiner* — Daniel C Chang
(74) *Attorney, Agent, or Firm* — Jim DeCarlo; Greenberg Traurig

(57) ABSTRACT

Disclosed frameworks for generating an image including a salient object and a staged background include extracting a salient object from a source image and applying a generative model to the salient object to generate the image. According to some embodiments, extracting a salient object from a source image involves using salient object detection method to identify the relevant portions of the source image corresponding to the salient object. In some embodiments, the generative model is a generative adversarial network trained using a domain relevant dataset.

17 Claims, 7 Drawing Sheets

(51) Int. Cl.
  *G06V 10/46* (2022.01)
  *G06V 10/88* (2022.01)

(56) References Cited

OTHER PUBLICATIONS

Qin et al. "U2-Net: Going Deeper with Nested U-Structure for Sallent Object Detection," 15 pages (2020).
Wang et al., "Image Inpainting with External-internal Learning and Monochromic Bottleneck," 15 pages (2021).
Nazeri et al. "EdgeConnect: Generative Image Inpainting with Adversarial Edge Learning," 17 pages (2019).
Mishra et al. "Learning to Create Better Ads: Generation and Ranking Approaches for Ad Creative Refinement," 9 bages (2020).
Zhou et al., "Understanding Consumer Journey using Attention based Recurrent Neural Networks," Applied Data Science Track Paper, 10 pages (2019).
Mishra et al. "Guiding Creative Design in Online Advertising," 5 pages (2019).
Yu et al., "Free-Form Image Inpainting with Gated Convolution," 17 pages (2019).
Zhou et al., "Recommending Themes for Ad Creative Design via Visual-Linguistic Representations," 7 pages (2020).
Goodfellow et al., "Generative Adversarial Nets," 9 pages (2014).
Mirza et al. "Conditional Generative Adversarial Nets," 7 pages (2014).
Ronneberger et al., "U-Net Convolutional Networks for Biomedical Image Segmentation," 8 pages (2015).
Szegedy et al., "Rethinking the Inception architecture for Computer Vision," 10 pages (2015).
Isola et al., "Image-to-Image Translation with Conditional Adversarial Networks," 17 pages (2018).
Heusel et al., "GANs Trained by a Two Time-Scale Update Rule Coverage to a Local Nash Equilibrium," 38 pages (2018).
Hussain et al.,, "Automatic Understanding of Image and Video Adverstisements," 11 pages (2017).
Wang et al., "High-Resolution Image Synthesis and Semantic Manipulation with Conditional GANs," 14 pages (2018).

* cited by examiner

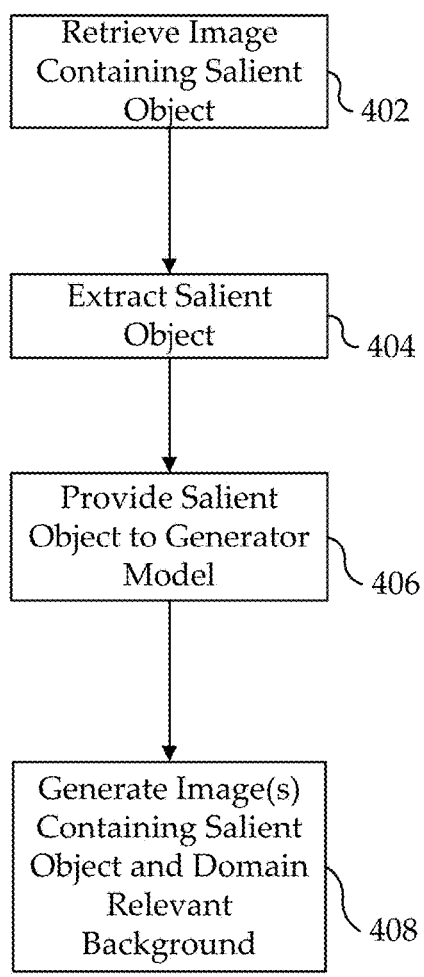
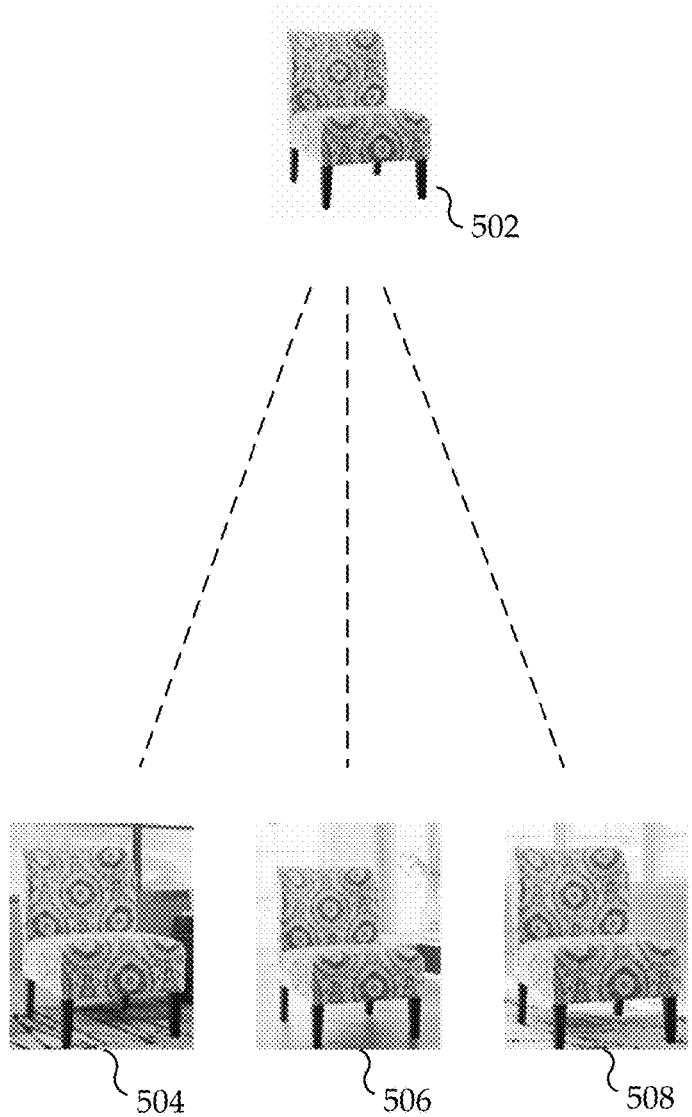
FIG. 4                    FIG. 5

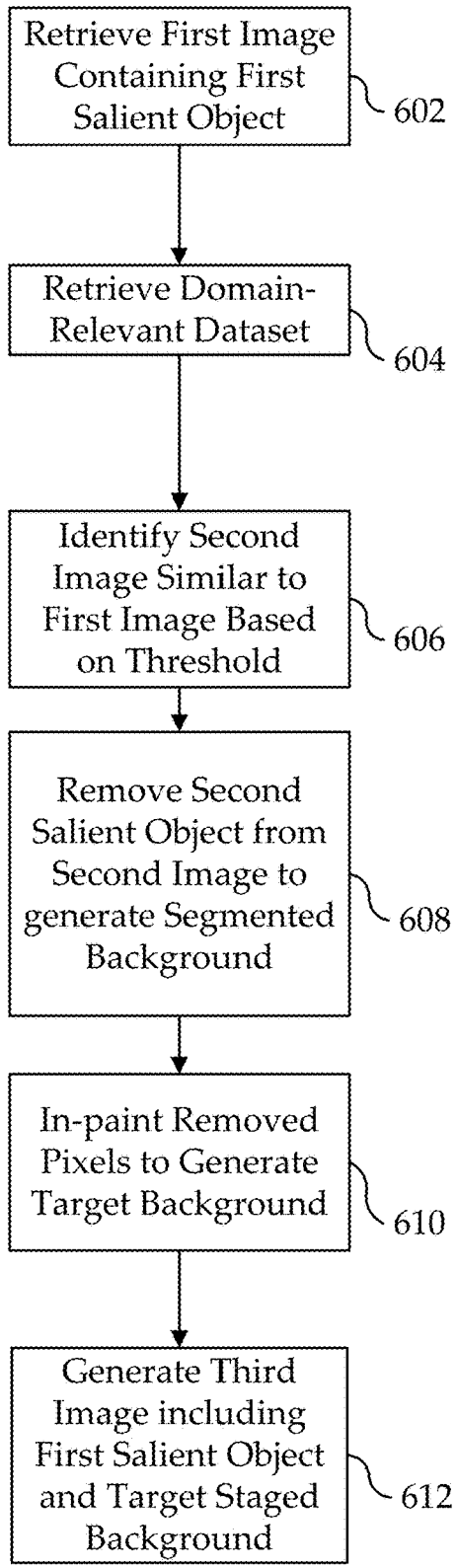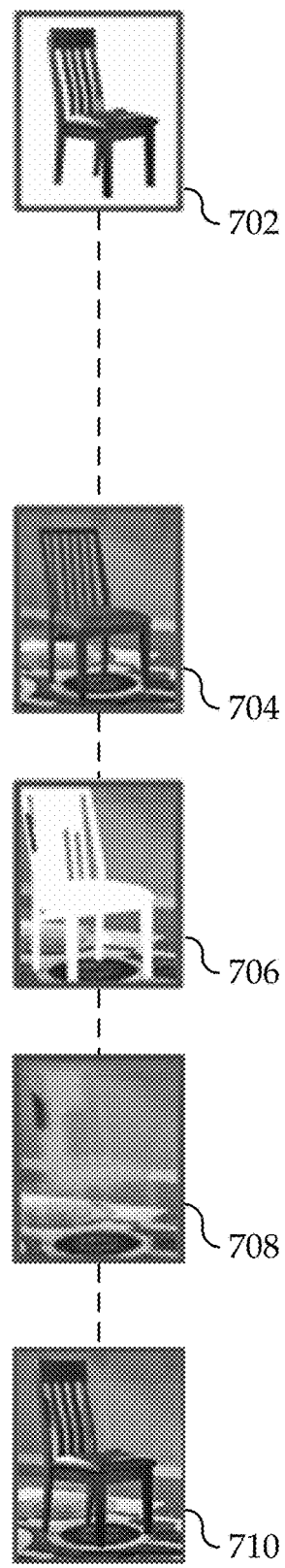
FIG. 6
FIG. 7

COMPUTERIZED SYSTEM AND METHOD FOR IMAGE CREATION USING GENERATIVE ADVERSARIAL NETWORKS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure relates generally to improving the performance of image generation systems by modifying the capabilities of and providing non-native functionality to devices, systems and/or platforms through a novel and improved framework for developing and training generative models and applying them to salient object image collections.

BACKGROUND

Traditionally, the promotion and advertisement of products has relied on images to illustrate not just the product but the setting in which the product may be used. The choice of image for a display or advertisement can have an outsized impact on the likelihood the user will procure the product. If the image is enticing enough, it can not only create brand awareness among potential purchasers but also result in a purchase (i.e., a conversion). On the other hand, if an image is not properly designed to capture the purchaser's attention, it will lead to poor interaction and could adversely impact the brand.

In the context of e-commerce, a deficient image may lead to lower revenue for advertising platforms and lower conversion rates for advertisers. Typically, products displayed in a natural or real-world setting (i.e., staged) tend to perform better than simple images of the product—for example, against a solid background. However, staging said products is usually expensive and time consuming. Manually inserting products into backgrounds with image editing software (e.g., Adobe® Photoshop®) is likewise expensive and time consuming, especially for large collections of salient objects and backgrounds.

SUMMARY

This disclosure provides a novel framework that alleviates shortcomings in the art, and provides mechanisms for performing cost-effective and scalable salient object staging using generative adversarial networks.

According to disclosed embodiments, as discussed below, a framework for generating an image including a salient object and a staged background functions by extracting a salient object from a source image and applying a generative model to the salient object to generate the image. In some embodiments, extracting a salient object from a source image involves using salient object detection methods to identify the relevant portions of the source image corresponding to the salient object. In some embodiments, the generative model is a generative adversarial network trained using a domain relevant dataset.

According to disclosed embodiments, as discussed below, a framework for selecting a domain relevant background and staging a salient object thereon functions by comparing a first image containing the salient object to other images in a domain relevant dataset to determine the image or images from the domain relevant dataset most similar to the first image. The identified images are analyzed to segment other salient objects, if any. The segmented images are then processed by an inpainting process to fill any blank or empty pixels resulting in background images. The salient object from the first image is then segmented and inserted into the background image or images to generate a new image depicting the salient object staged on the background depicted by the background image.

According to disclosed embodiments, as discussed below, a framework for generating an animation of a salient object on a staged background functions by processing an image containing the salient object and the staged background to segment the salient object and translate the object within the image. In some embodiments, after the salient object is translated any gaps (e.g., empty or blank pixels) are filled using an inpainting process. A series of frames may be created by moving the salient object and inpainting the gaps, if any. The series of frames can be used to generate an animation or video that depicts the salient object as moving with respect to the background.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 illustrates a process of background generation for a discrete salient object according to some embodiments of the present disclosure;

FIG. 5 illustrates salient objects and generated backgrounds in accordance with some embodiments of the present disclosure;

FIG. 6 illustrates a process for domain relevant background selection and salient object staging thereon according to some embodiments of the present disclosure;

FIG. 7 illustrates non-limiting example results from the process described in FIG. 6 in accordance with some embodiments of the present disclosure;

DETAILED DESCRIPTION

Figure 1:
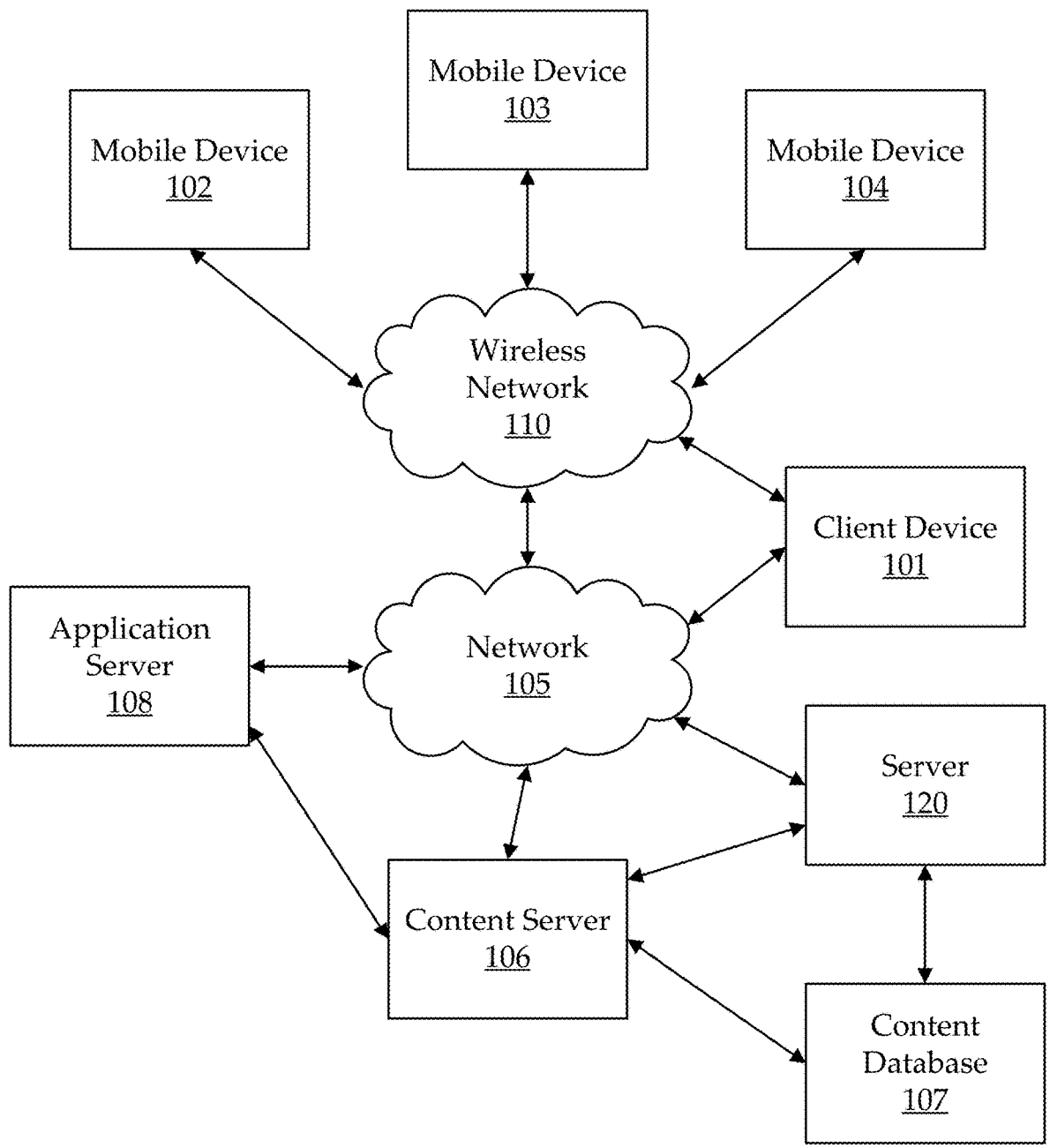
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, third party server 120, and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

Third party server 120 (in some embodiments, an "ad server") can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with the users. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is, advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the application server 108, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 120.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
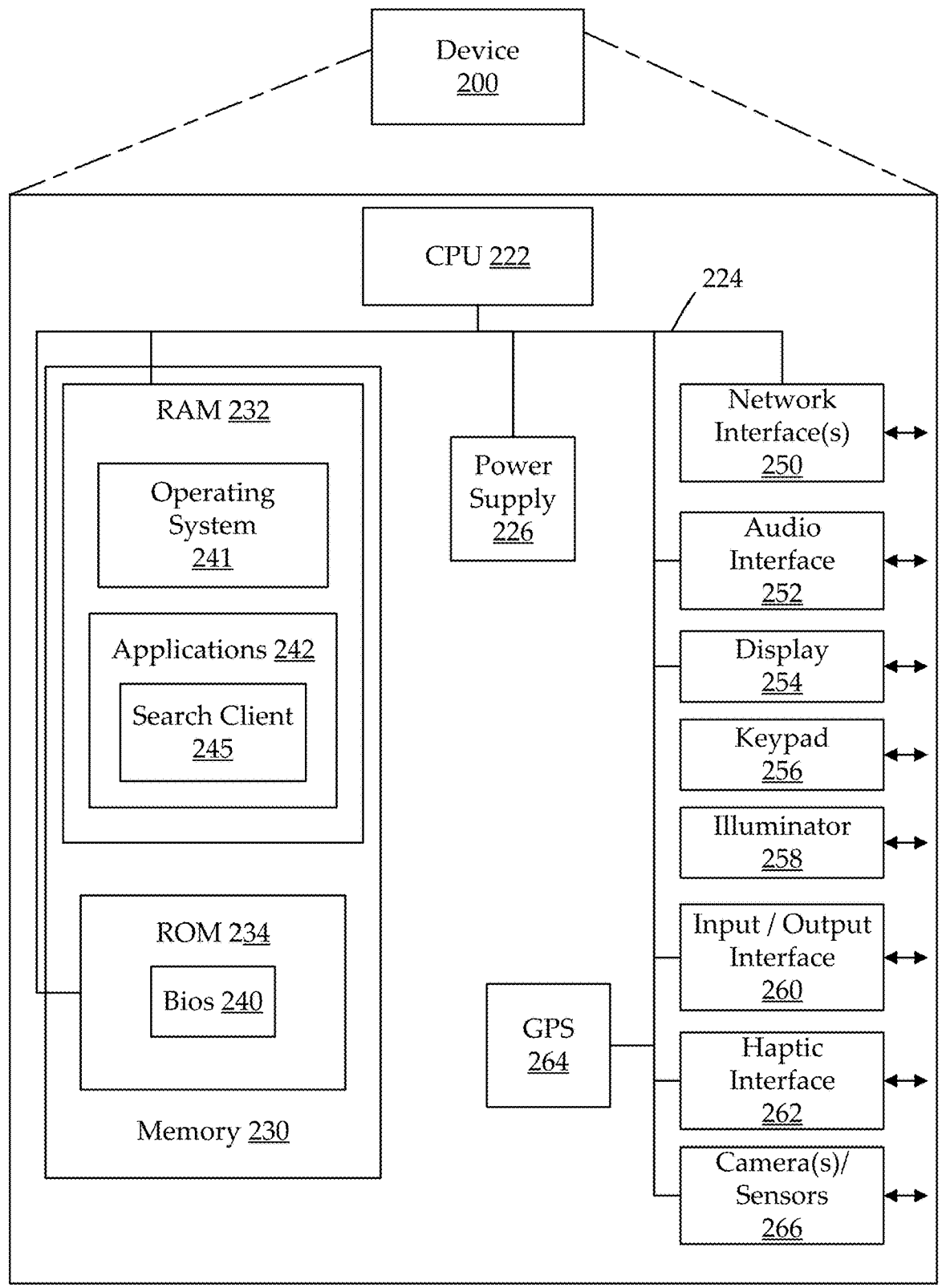
FIG. 2 is a schematic diagram illustrating an example of a device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the device.

Optional GPS transceiver 264 can determine the physical coordinates of Device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Device 200 on the surface of the Earth. In one embodiment, however, Device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Device 200. The mass memory also stores an operating system 241 for controlling the operation of Device 200

Memory 230 further includes one or more data stores, which can be utilized by Device 200 to store, among other things, applications 242 and/or other information or data. For example, data stores may be employed to store information that describes various capabilities of Device 200. At least a portion of the capability information may also be stored on a disk drive or other storage medium (not shown) within Device 200.

Applications 242 may include computer executable instructions which, when executed by Device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
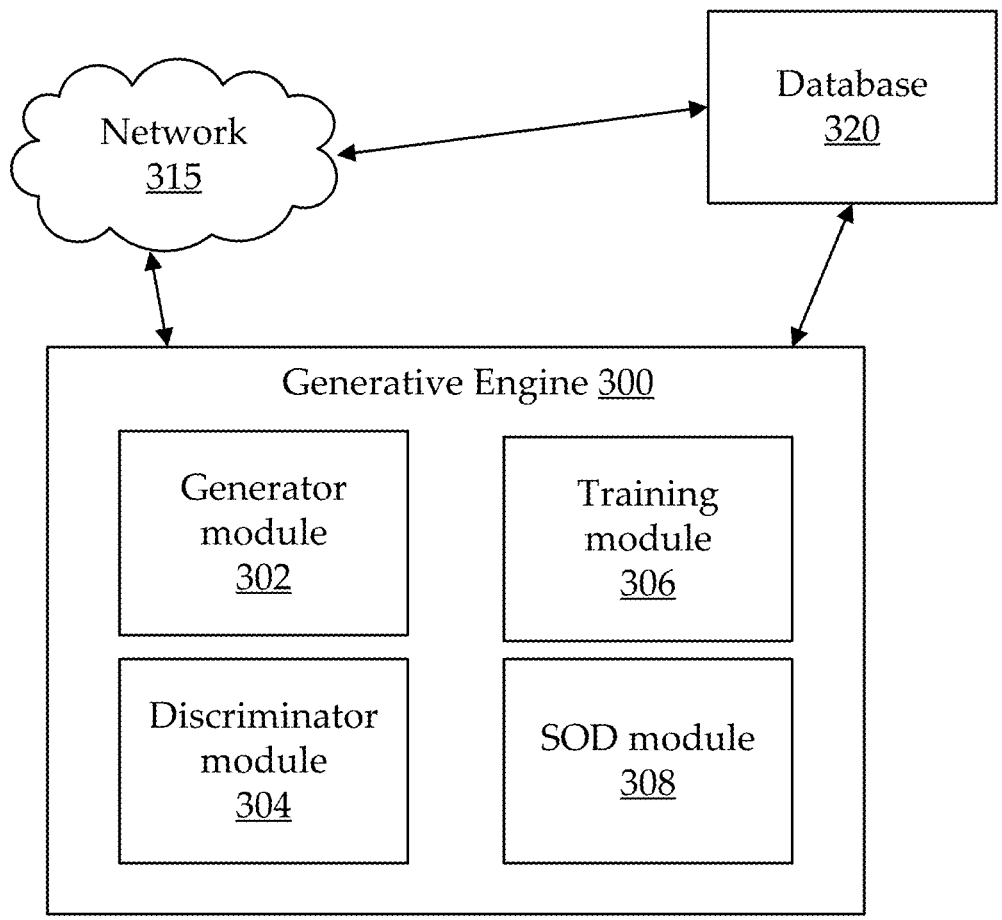
FIG. 3 is a block diagram illustrating components of an exemplary system in accordance with embodiments of the present disclosure.

Turning now to FIG. 3, a block diagram illustrating the components for performing the systems and methods discussed herein is shown. FIG. 3 includes generative engine 300, network 315 and database 320. The generative engine 300 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, generative engine 300 can be embodied as a stand-alone application that executes on a user device. In some embodiments, the generative engine 300 can function as an application installed on the user's device, and in some embodiments, such application can be a web-based application accessed by the user device over a network. In some embodiments, portions of the generative engine 300 function as an application installed on the user's device and some other portions can be cloud-based or web-based applications accessed by the user's device over a network, where the several portions of the generative engine 300 exchange information over the network. In some embodiments, the generative engine 300 can be installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). In an embodiment, database 320 may comprise a dataset of data and metadata associated with local and/or network information related to users, services, applications, content and the like.

In some embodiments, such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user patterns, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, messages, images, videos, text, products, items and services from an assortment of media, applications and/or service providers and/or platforms, and the like. Accordingly, any other type of known or to be known attribute or feature associated with a message, data item, media item, login, logout, website, application, communication (e.g., a message) and/or its transmission over a network, a user and/or content included therein, or some combination thereof, can be saved as part of the data/metadata in datastore 320.

In an embodiment, database 320 may comprise a domain specific training dataset including a collection of labeled media. In an embodiment, the training dataset comprises a collection of images and associated labels corresponding to a specific domain. In an embodiment, the training dataset comprises a collection of videos and associated labels corresponding to a specific domain. In an embodiment, the training dataset comprises a collection of audio files and associated labels corresponding to a specific domain. In some embodiments, the domain specific training dataset is used to train a neural network or a generative model including neural networks (e.g., GANs or cGANs).

In some embodiments, training dataset corresponds to images depicting salient objects superposed on a background representative of a typical setting where that salient object may be used (e.g., a staged background). In some embodiments, the background may be a solid background—all pixels other than the pixels corresponding to the salient object have the same value. In some embodiments, the background may have a color gradient background—all pixels other than the pixels corresponding to the salient object have values within a given range or ranges of values. In some embodiments, images depicting salient objects may have no background—all pixels other than the pixels corresponding to the salient object have no value, a value of 0, or a value corresponding to a transparent background.

In an embodiment, the salient objects may be housewares including furniture and the background may be a staged, solid, or gradient background. In some embodiments, a salient object may be a table, chair, lamp, and the like while the background may be a staged background including windows, doors, baseboards, decorative moldings, and the like. In some embodiments, the salient object is an automobile part, and the staged background is the inside of the car, the engine bay, and the like.

In an embodiment, the training dataset may be a collection of advertisement images depicting products (i.e., salient objects) in staged, solid, or gradient backgrounds. In an embodiment, each product corresponds to a specific hierarchical category or sub-categories, for example: "kids/kids nightstands", "furniture/bedroom/headboards/queen", "shoe/heel/oxford heel". In some embodiments, each category or subcategory may be a domain of the domain specific training dataset. In a non-limiting example, the domain is furniture. In a non-limiting example, the domain is car parts. It will be understood that a domain may be any group or category of products that may be displayed in an advertisement, whether known or to be known, without departing from the scope of the present disclosure.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the generative engine 300, and the database of stored resources 320. Indeed, as illustrated in FIG. 3, the generative engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as generative engine 300, and includes generator module 302, discriminator module 304, training module 306 and salient object detection module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Saliency Detection

An aspect of the present disclosure is the use of saliency detection methods to detect and/or extract salient objects (i.e., a relevant object or a target object) in an image or a frame of a video. Generally, these methods may be referred to as salient object detection ("SOD") methods.

Some saliency detection methods aim to differentiate between a salient object and the background. Other methods aim to differentiate between a salient object (e.g., as defined by a set of parameters), non-salient objects (e.g., outside of the defined parameters), and the background (e.g., neither salient nor non-salient). In some embodiments, salient objects, non-salient objects, and the background may each be defined by a set of pixel values. As will be noted, in some embodiments, the background may encompass all or substantially all pixels other than the pixels corresponding to a salient object.

In a non-limiting example, in the context of housewares, a salient object may be a table, chair, lamp, and the like while a non-salient object may be a window, a door, baseboards, decorative molding, and the like, or vice versa. In another non-limiting example, in the context of cars and car parts, a salient object may be a steering wheel, a radio, or a shift knob while a non-salient object is a dashboard or a glovebox. In a non-limiting example, in the context of images illustrating a sporting event, a SOD method may determine which portions of an image correspond to a player appearing in the image as opposed to the stands or the playing field.

In some embodiments, a SOD method may detect salient object(s) in an image or frame and provide precise boundaries in the image defining the salient object(s). In some embodiments, the SOD method returns a boundary map which can be used to segment out the salient object(s) from the image. In some embodiments, the SOD method returns a feature map which can be used to segment out the salient object(s) from the image. In some embodiments, the SOD method returns a set of pixel values which can be used to segment out the salient object(s) from the image. In an embodiment, in the context of images illustrating an advertisement or a product being advertised, a SOD method may determine which portions (e.g., discrete pixels) of an image correspond to a product being advertised as opposed to a staged background.

In some embodiments, a salient object may be defined by a predetermined set of parameters or characteristics. In some embodiments, the predetermined set of parameters may be a feature map. In some embodiments, the predetermined set of parameters may be a set of pixel values. In some embodiments, the predetermined set of parameters may be at least one geometric rule. In some embodiments, the predetermined set of parameters may be at least one label of the image or frame. In some embodiments, a salient object may be defined by a set of pixel values. In some embodiments, a salient object may be defined by a set of pixels.

In some embodiments, SOD methods disclosed herein may use machine learning techniques or deep learning techniques including neural networks. In some embodiments, a neural network may be a convolutional neural network. In some embodiments, SOD methods use deep learning techniques including deep network architectures like $U^2$-Net. It should be understood that methods described herein contemplate SOD methods and techniques capable of segmenting salient object from images, whether known or to be known, without departing from the scope of the present disclosure.

In an embodiment, an SOD method takes in a given image and generates a saliency probability map. In some embodiments, a saliency probability map may contain saliency probability values for each pixel in an image. The saliency probability values represent the likelihood a given pixel corresponds to a salient object in the image. In some embodiments, using the saliency probability map a binary mask may be generated to delineate between salient objects and the background. In an embodiment, binary masks can be used to segment images to remove the background and leave only salient objects or vice versa. In some embodiments, the binary mask is generated by setting a saliency threshold and excluding all pixels whose saliency probability values are above, below, or equal to the threshold. In some embodiments, the range of saliency probability values is 0 to 1. In some embodiments, the saliency threshold is 0.5.

In an embodiment, SOD methods as described herein are implemented in whole or in part on SOD module 308. In some embodiments, a method of detecting a salient object in an image includes retrieving by the SOD module 308 at least one image from the database 320 and generating a saliency map corresponding to the salient product. In some embodiments, the method may further include using the saliency map to segment the image and generate other images including a new image depicting the salient object only or another new image depicting the background only. In some embodiments, a new image depicting the background only will have pixels of the same value (solid color) or of no value (transparent) in place of the pixels corresponding to the salient object in the original image.

In some embodiments, the SOD module 308 may implement at least one neural network architecture (e.g., $U^2$-Net) to perform salient object detection on an image received from database 320. In some embodiments, a neural network implemented by the SOD module 308 may be trained at least in part by the training module 306 and a domain specific training dataset from the database 320. In some embodiments, a neural network implemented by the SOD module 308 may be trained at least in part by the training module 306 and a domain agnostic training dataset from the database 320.

Image Generation Using Generative Adversarial Networks

Another aspect of the present disclosure are methods of image and video generation using conditional generative adversarial networks ("cGANs"). As will be understood by those skilled in the art, generative adversarial networks ("GANs") are deep learning generative models that are capable of generating new or fake images that could plausible be found in a domain specific dataset of real images. Typically, GANs include two competing sub-models: a generator model and a discriminator model. In some embodiments, the generator and discriminator may be implemented as neural networks, each having a set of model parameters that may be adjusted during a training process to minimize a loss function or a plurality of loss functions.

In some embodiments, during a training process, the generator and discriminator models are trained together. The generator will generate or output a fake image or batch of fake images from a random noise input (i.e., an input or seed vector drawn from a Gaussian distribution). The discriminator will then take the fake images along with real images from the domain specific dataset and classify each as real or fake. Depending on the discriminator's ability to label each image as real or fake correctly, the discriminator model parameters may be updated to improve classification performance in the next iteration. The generator model parameters may also be updated to generate better fake images for the next iteration. This process is repeated until the discriminator cannot distinguish between images from the domain and images generated by the generator.

As will be further understood, cGANs are a subset of GANs where the generation of the output image is based on a given input. Generally, this process may be referred to as image-to-image translation. In cGANs, instead of a random noise input, the generator is provided with a seed image (e.g., a seed vector) and outputs a transformation of the image based on the training dataset used to train the cGAN. In some embodiments, cGANs may input a combination of a seed image and a random noise vector. A non-limiting example of a cGAN for image-to-image translation is the pix2pix generative model.

Returning to FIG. 3, in an embodiment, the generator model and discriminator model may be implemented by the generator module 302 and the discriminator module 304 of the generative engine 300, respectively. In some embodiments, the generator module 302 and the discriminator module 304 each implement at least one neural network. In some embodiments, the generator module 302 and the discriminator module 304 form part of a neural network.

In some embodiments, a neural network implemented by the generator module 302 may be trained at least in part by the training module 306 and a domain specific training dataset from the database 320. In some embodiments, a neural network implemented by the generator module 302 may be trained at least in part by the training module 306 and a domain agnostic training dataset from the database 320.

In some embodiments, a neural network implemented by the discriminator module 304 may be trained at least in part by the training module 306 and a domain specific training dataset from the database 320. In some embodiments, a neural network implemented by the discriminator module 304 may be trained at least in part by the training module 306 and a domain agnostic training dataset from the database 320.

In some embodiments, the generator module 302 and the discriminator module 304 may be trained independent of each other. In some embodiments, the generator module 302 and the discriminator module 304 may be trained jointly. As may be understood by those skilled in the art, neural networks that may be implemented by the generator module 302, the discriminator module 304, and the SOD module 308 may contain layers of neurons or nodes with associated weights. In some embodiments, during a training process, the weights of the neural network may be optimized based on a calculated model error using a loss function, the calculated model error describing the difference between an expected output of the neural network and an actual output.

In some embodiments, a loss function of a discriminator model may be referred to as an adversarial loss. In some embodiments, an optimization of a loss function for a discriminator model includes minimizing a negative log likelihood of identifying real and fake images. In some embodiments, an optimization of a loss function for a generator model includes minimizing an L1 distance, sometimes known as the L1 loss. As will be understood by those in the art, in some embodiments, the L1 distance refers to a mean absolute pixel difference between a generated image of the source image and the expected target image. It will be further understood, that in other embodiments, an L1 distance may describes additional concepts, whether known or to be known, without departing from the scope of the present disclosure.

In some embodiments, during a training process of a cGAN that may be implemented on generator module 302 and discriminator module 304, a first image (e.g., a real image) depicting a salient object on a first staged background is retrieved from the database 320. In some embodiments, the training process is controlled in part by the training module 306. In some embodiments, the training process requires no supervision. In some embodiments, the training process requires minimal supervision. Then, the salient object may be segmented from the background by SOD module 308 and provided to the generator module 302. Based on the segmented image, the generator module may generate a second image (e.g., a fake image) depicting the salient object on a second staged background. In some embodiments, the first image and the second image are then provided to the discriminator module to determine whether the images are real or fake. In some embodiments, a loss may be calculated using a loss function. In some embodiments, the loss function may include the adversarial loss and the L1 distance between the first image and the second image. In some embodiments, the training process is repeated until the loss is optimized to an acceptable threshold.

In some embodiments, during a generative process, a neural network generator module 302 may input a random noise vector and generate an image with substantially similar characteristics to images in a training dataset, where the training dataset was used to train at least one neural network implemented by at least one of the generator module 302 and the discriminator module 304. In some embodiments, during a generative process, a neural network generator module 302 may input a seed image and generate an image with substantially similar characteristics to images in a training dataset, where the training dataset was used to train at least one neural network implemented by at least one of the generator module 302 and the discriminator module 304.

In some embodiments, the database 320 may contain the seed image or images used during a generative process. In some embodiments, the seed images may illustrate salient objects with a solid background, a gradient background, a transparent background, or no background.

Image Inpainting Using Generative Models

An aspect of the present disclosure is an inpainting process using a generative model. In a non-limiting example, an inpainting process may fill in empty or blank pixels in an image where the empty or blank pixels correspond to a salient object that has been removed from the image. In some embodiments, an inpainting process may use a generative model as described herein to fill in the empty or blank pixels in an image. In some embodiments, an inpainting process may be implemented on generative engine 300. In some embodiments, an inpainting process may use a GAN or cGAN as described herein to fill empty or blank pixels in an image to generate a background. In an embodiment, a generative model of an inpainting process may include the EdgeConnect model.

As will be noted, in some embodiments, generative models as described herein may use a loss function including an adversarial loss ($L_{ADV}$) and a feature-matching loss ($L_{FM}$). In some embodiments, a loss function of a generative model may also include a weighted boundary loss ("WBL"). In some embodiments, in the context of inpainting empty or blank pixels, a WBL amplifies the loss penalty at the boundary area pixels (i.e., the pixels between the empty or blank pixels and the background pixels). In an embodiment, a WBL is defined by Equation (1).

$$L_{WBL} = W_{map} * L_{l1\text{-}norm}(E_{GT}, E_{pred}) \quad (1)$$

Where $E_{GT}$ is a ground truth edge map of the input image or images and $E_{pred}$ is a predicted edge map generated by a generator of the generative model. In some embodiments, $W_{MAP}$ is a pixel-wise weighted map that has the same size as the input masked images and ground truth. In some embodiments, $W_{MAP}$ includes $\lambda_{boundary}$ for pixels around the boundary between the empty or blank pixels and the background (e.g., masked and unmasked areas, or vice versa) and $\lambda_{non\text{-}boundary}$ for pixels away from the boundary. To calculate $L_{WBL}$, pixel-wise $L_{l1\text{-}norm}$ is multiplied with the corresponding $\lambda$.

Figure 9C:
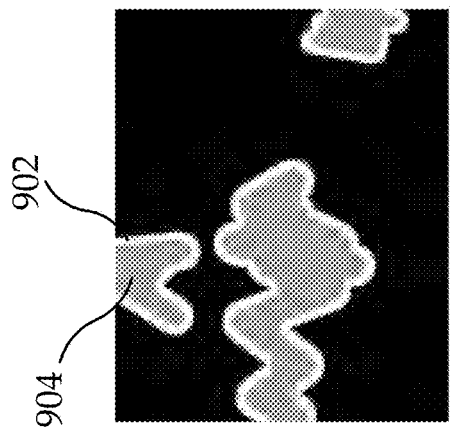
Figure 9B:
Figure 9A:

In an embodiment, an inpainting process creates a freeform dense mask using a generative model. In a non-limiting example, FIGS. 9A-9C illustrate the outputs of a mask generation method. In some embodiments, FIG. 9A illustrates a ground truth image, FIG. 9B. illustrates a free form mask on the ground truth image, and FIG. 9C illustrates a weighted boundary wherein the pixels 902 correspond to $\lambda_{boundary}$ and the pixels 904 correspond to $\lambda_{non\text{-}boundary}$. In some embodiments, $\lambda_{boundary}$ may have a value of 0.9. In some embodiments, $\lambda_{boundary}$ may have a value other than 0.9. In some embodiments, $\lambda_{non\text{-}boundary}$ may have a value of 0.1. In some embodiments, $\lambda_{non\text{-}boundary}$ may have a value other than 0.1.

Domain Relevant Background Generation

Turning to FIG. 4, process 400 details non-limiting embodiments for background generation for a discrete salient object. According to some embodiments, process 400 generates an image depicting a salient object in a staged background. Process 400 of FIG. 4 begins with step 402 where an image containing a salient object (e.g., Block 502 of FIG. 5) is retrieved from a database of salient object images. In some embodiments, in step 402, the SOD module 308 may retrieve an image containing a salient object from database 320. In some embodiments the retrieved image contains a staged background in addition to the salient object. In some embodiments, the retrieved image contains a transparent background, a solid background, a gradient background, or no background.

In step 404, the salient object may be detected and segmented using an SOD method as described herein. In some embodiments, in step 404, the salient object may be detected, and the background removed using an SOD method as described herein. In some embodiments, in step 404, the salient object may be detected, segmented, and/or extracted using the SOD module 308.

In step 406, the salient object may be provided to a generator model to generate a domain relevant background based on the salient object. In some embodiments, in step 406, the salient object may be transmitted from the SOD module 308 to the generator module 302.

In step 408, the generator model generates a new image depicting the salient object in a domain relevant staged background (e.g., Block 504, 506, and 508 of FIG. 5). As noted above, in some embodiments, a domain relevant staged background may be a background representative of a typical setting where that salient object may be used.

Salient Object Placement on Domain Relevant Background

Turning to FIG. 6, process 600 details non-limiting embodiments for domain relevant background selection and salient object staging thereon. According to some embodiments, process 600 generates an image depicting a first salient object in a staged background using the background from an image depicting second salient object (or several images each depicting a different second salient object) where the second salient object is substantially similar to the first salient object.

Process 600 of FIG. 6 begins with step 602 where a first image containing a first salient object (e.g., Block 702 of FIG. 7) is retrieved from a database (e.g., database 320) of salient object images. In some embodiments, the first image may contain a background as described elsewhere herein. In some embodiments, the first image may be segmented to extract the first salient object and/or remove the background. Still, in some embodiments, the first image may not be segmented.

In step 604, the process 600 may retrieve a domain relevant dataset from a database (e.g., database 320). In some embodiments, the domain relevant dataset is selected based on the first image. In some embodiments, the first image is part of the domain relevant database. In some embodiments, the domain relevant dataset contains images depicting similar salient objects on similar backgrounds, whether staged or not.

In step 606, first image may be compared against at least one other image from the domain relevant dataset to determine a similarity. In some embodiments, the first image may be compared against a plurality of images from the domain relevant dataset to determine the closest or most similar image to the first image from the plurality of images. In some embodiments, the first image may be compared against a plurality of images from the domain relevant dataset to determine the closest or most similar image to the first image from the domain relevant dataset.

As will be understood, methods of measuring similarity between images are known in the art. As will be further understood, in some embodiments, images to be compared may have embeddings corresponding to at least one of a description of the image, a characteristic of the image, a salient object depicted by the image, and a background depicted by the image. In some embodiments, a similarity measure method may determine a Euclidean distance between embeddings corresponding to each images. In some embodiments, a similarity measure method may determine a cosine distance between embedding corresponding to each images. In some embodiments, a similarity measure method may determine a dot product between embedding corresponding to each images. In some embodiments, a similarity measure method may use a machine learning model similar to the Inception-V3 model.

In some embodiments, a similarity measure method provides a list of images ranked by their similarity (e.g., a set of k answers) to the first image. In some embodiments, the image most similar to the first image is referred to as the top-k.

Returning to step 606, in some embodiments, the image most similar to the first image is identified—i.e., the second image. Block 704 of FIG. 7 illustrates a non-limiting example of a second image including a second salient object. In some embodiments, the second image may illustrate a second salient object similar to the first salient object of the first image. In some embodiments, the second image may illustrate a domain relevant background. In some embodiments, a predetermined number (i.e., a set of second images) of the most similar images to the first image is selected (e.g., the top 3 or the top 5).

In step 608, the second image is processed using an SOD method as described herein to segment a second salient object from the second image and extract the background, hereinafter, the segmented background. In some embodiments, the SOD method may be implemented by the SOD module 308 of FIG. 3. In some embodiments, after removing the second salient object the segmented background will include empty or blank pixels where the second salient object used to be. Block 706 of FIG. 7 illustrates a non-limiting example of a second image including a segmented background and empty pixels where the second salient object used to be.

In step 610, the empty or blank pixels of the target background are filled by an inpainting process. In some embodiments, an inpainting process may use a generative model as described herein to fill in the empty or blank pixels in the segmented background and generate a target background. Block 708 of FIG. 7 illustrates a non-limiting example of target background. In some embodiments, an inpainting process may be implemented on generative engine 300. In some embodiments, an inpainting process may use a GAN or cGAN as described herein to fill in the empty or blank pixels in the segmented background and generate a target background. In an embodiment, a generative model of an inpainting process may include the EdgeConnect model.

In step 612, a third image may be generated by inserting the first salient object from the first image into the target background. In step 612, a set of third images may be generated by inserting the first salient object from the first image into a set of target backgrounds corresponding to a set of second images. Block 710 of FIG. 7 illustrates a non-limiting example of a third image. In some embodiments, inserting the first salient object into the target background includes manipulating at least one of the salient object and the target background. As will be understood, methods of combining or superposing images are well known in the art. In an embodiment, a method of inserting the first salient object into the target background comprises aligning a shape and a center mass of a mask of the first salient object to a mask of the second salient object generated by the SOD method in step 608.

Object Animation on Domain Specific Background

Figure 8:
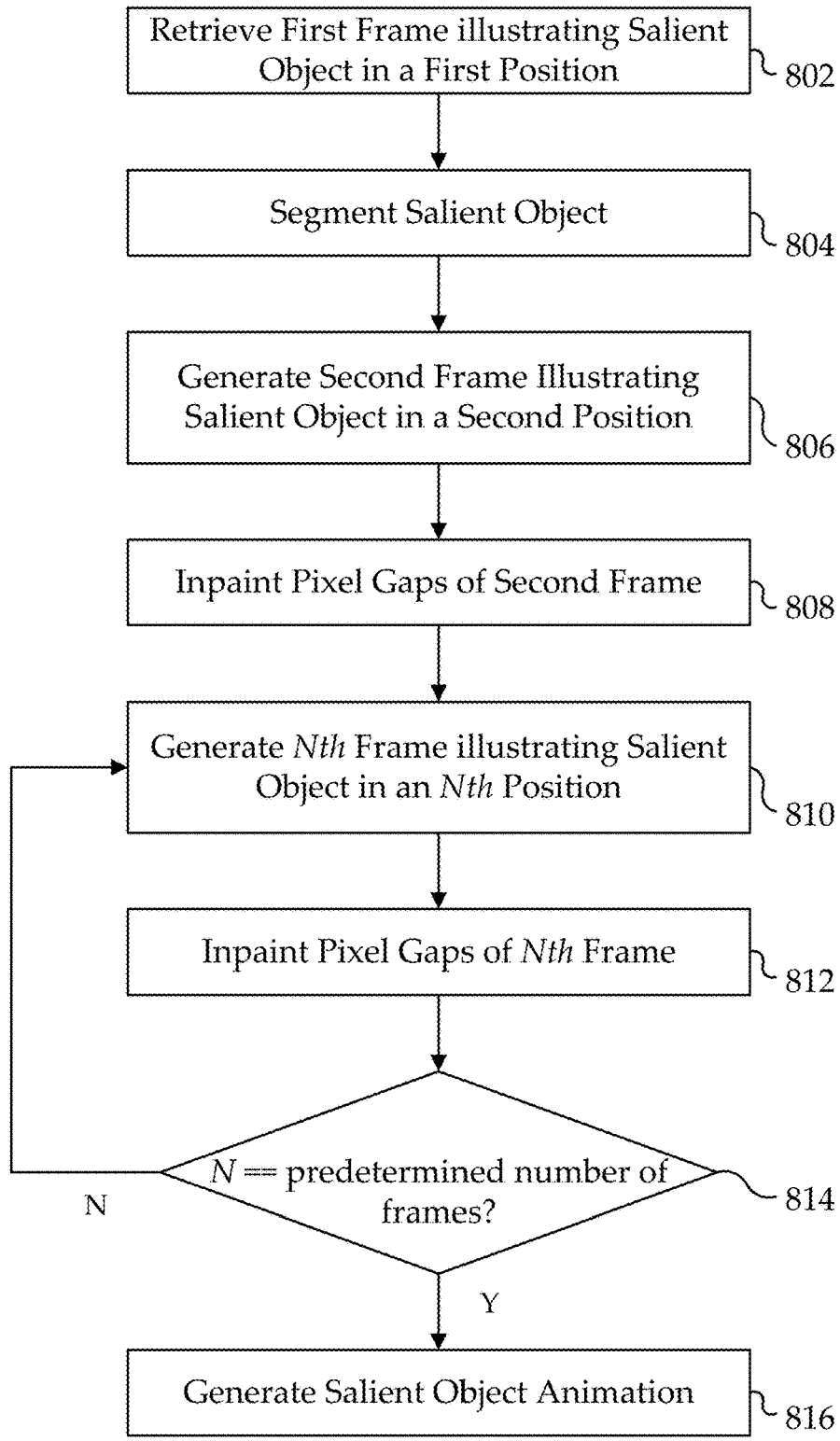
FIG. 8 illustrates a process for creating an animation of a salient object from a two-dimensional image in accordance with some embodiments of the present disclosure; and, FIG. 9A-9C illustrates non-limiting example results from a mask generation process in accordance with some embodiments of the present disclosure.

Turning to FIG. 8, process 800 details non-limiting embodiments for creating an animation of a salient object from a two-dimensional image depicting the salient object. According to some embodiments, process 800 may generate a sequence of frames from a single two-dimensional image or frame. According to some embodiments, a process 800 may result in a sequence of frames illustrating a parallax effect which creates an illusion of depth in a two-dimensional image. According to some embodiments, a process 800 may result in a sequence of frames where a salient object appears to be moving against a station but staged background.

Process 800 begins with step 802 where a first frame (i.e., an image) containing a salient object is retrieved from a database of salient object images. In some embodiments, the first frame includes a background.

In step 804, the salient object is identified and segmented from the background. In some embodiments, step 804 generates an image corresponding to the background and an image corresponding to the salient object. In step 804, the salient object may be detected and segmented using an SOD method as described herein. In some embodiments, in step 404, the salient object may be detected, and the background removed using an SOD method as described herein. In some embodiments, in step 804, the salient object may be detected and segmented using the SOD module 308.

In step 806, in some embodiments, the salient object is translated a number of pixels in at least one direction from a first position to a second position creating a second frame. In some embodiments, the number of pixels may be a predetermined number of pixels. In some embodiments, the number of pixels may be a random number of pixels. In some embodiments, the number of pixels may be selected from within a range. In some embodiments, the at least one direction may be a predetermined direction. In some embodiments, the direction may be selected at random. In some embodiments, the salient object is translated by a number of pixels in one direction and by another number of pixels in another direction.

As will be noted, translating the salient object may create gaps in the second frame with empty or blank pixels. In step 808, an inpainting process as described herein may be leveraged to inpaint the empty or blank pixels in the second frame.

In step 810, an $N^{th}$ frame may be generated by translating the salient object from at least one of the first position and the second position to an $N^{th}$ position. As noted above, translating the salient object may create gaps in the $N^{th}$ frame with empty or blank pixels. In step 812, the inpainting process as described herein may be leveraged to inpaint the empty or blank pixels in the $N^{th}$ frame.

In step 814, if a predetermined number of frames has not been reached the process returns to step 810 and steps 810 and 812 are repeated until the predetermined number of frames is reached.

If the predetermined number of frames has been reached, the process moves to step 816. In step 816, in some embodiments, all frames are placed in a sequence to generate a salient object animation or video depicting the salient object as moving. In some embodiments, at least some of the frames are placed in a sequence to generate a salient object animation or video depicting the salient object as moving.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    retrieving a first image corresponding to a domain, the first image including a first salient object;
    retrieving a second image corresponding to the domain, the second image including a second salient object;
    generating a segmented background by removing the second salient object from the second image, the segmented background having removed pixels;
    generating a target background by inpainting the removed pixels of the segmented background; and
    generating a third image including the first salient object and the target background by aligning a shape and a center mass of a mask of the first salient object to a mask of the second salient object.

2. The method of claim 1, wherein the step of generating a segmented background comprises detecting and segmenting the second salient object using a salient object detection model.

3. The method of claim 1, further comprising extracting, by a salient object detection model, the first salient object from the first image.

4. The method of claim 1, wherein the step of generating a target background by inpainting is performed by an inpainting process using at least one neural network having a loss function comprising a weighted boundary loss.

5. The method of claim 1, further comprising animating the third image, the step of animating comprising:
   generating a salient object animation frame by:
   segmenting the first salient object from the third image;
   translating the first salient object from a first position to a second position; and,
   inpainting blank pixels in the salient object animation frame using an inpainting process;
   generating an N number of salient object animation frames by repeating the steps of segmenting, translating, and inpainting; and,
   generating a salient object animation comprising at least some of the salient object animation frames.

6. The method of claim 5, wherein the inpainting process uses at least one neural network having a loss function comprising a weighted boundary loss.

7. A method comprising:
   retrieving a first image corresponding to a domain, the first image including a first salient object;
   retrieving a domain relevant dataset corresponding to the domain, the domain relevant dataset including a plurality of second images, the second images having second salient objects;
   ranking the plurality of second images based on a similarity measure of each second image to the first image;
   selecting a subset of second images from the plurality of second images based on the ranking;
   generating a set of segmented backgrounds by removing the second salient objects from each second image from the subset of second images, each of the segmented background of the set of segmented backgrounds having removed pixels;
   generating a set of target backgrounds by inpainting the removed pixels of each segmented background of the set of segmented backgrounds; and,
   generating a set of third images each image of the set of third images including the first salient object and a target background from the set of target backgrounds by aligning a shape and a center mass of a mask of the first salient object to a mask of each of the second salient objects of the second images of the subset of second images.

8. The method of claim 7, wherein the step of generating a set of segmented backgrounds comprises detecting and segmenting the second salient objects using a salient object detection model.

9. The method of claim 7, further comprising extracting, by a salient object detection model, the first salient object from the first image.

10. The method of claim 7, wherein the step of generating a set of target backgrounds by inpainting is performed by an inpainting process using at least one neural network having a loss function comprising a weighted boundary loss.

11. The method of claim 7, further comprising animating each of the set of third images, the step of animating comprising:
   generating a salient object animation frame by:
   segmenting the first salient object from a third image from the set of third images;
   translating the first salient object from a first position to a second position; and,
   inpainting blank pixels in the salient object animation frame using an inpainting process;
   generating an N number of salient object animation frames by repeating the steps of segmenting, translating, and inpainting; and,
   generating a salient object animation comprising at least some of the salient object animation frames.

12. The method of claim 11, wherein the inpainting process uses at least one neural network having a loss function comprising a weighted boundary loss.

13. A non-transitory computer-readable storage medium for tangibly storing computer program instructions capable of being executed by a computer processor, the computer program instructions defining steps of:
   retrieving a first image corresponding to a domain, the first image including a first salient object;
   retrieving a second image corresponding to the domain, the second image including a second salient object;
   generating a segmented background by removing the second salient object from the second image, the segmented background having removed pixels;
   generating a target background by inpainting the removed pixels of the segmented background; and
   generating a third image including the first salient object and the target background by aligning a shape and a center mass of a mask of the first salient object to a mask of the second salient object.

14. The non-transitory computer-readable storage medium of claim 13, wherein the step of generating a segmented background comprises detecting and segmenting the second salient object using a salient object detection model.

15. The non-transitory computer-readable storage medium of claim 13, further comprising extracting, by a salient object detection model, the first salient object from the first image.

16. The non-transitory computer-readable storage medium of claim 13, wherein the step of generating a target background by inpainting is performed by an inpainting process using at least one neural network having a loss function comprising a weighted boundary loss.

17. The non-transitory computer-readable storage medium of claim 13, further comprising:
   retrieving a domain relevant dataset corresponding to the domain, the domain relevant dataset including a plurality of second images, the second images having second salient objects;
   ranking the plurality of second images based on a similarity measure of each second image to the first image;
   selecting a subset of second images from the plurality of second images based on the ranking;
   generating a set of segmented backgrounds by removing the second salient objects from each second image from the subset of second images, each of the segmented background of the set of segmented backgrounds having removed pixels;
   generating a set of target backgrounds by inpainting the removed pixels of each segmented background of the set of segmented backgrounds; and,
   generating a set of fourth images each image of the set of fourth images including the first salient object and a target background from the set of target backgrounds.

* * * * *